United States Patent [19]

Glass et al.

[11] 4,448,841

[45] May 15, 1984

[54] FLAME RETARDANT COMPOSITIONS FOR TEXTILES AND TREATED TEXTILES

[75] Inventors: Cyril Glass; Leslie G. Hursey; Ronald Inness-Turnbull, all of London, England

[73] Assignee: The Sargom Company Limited, London, England

[21] Appl. No.: 428,559

[22] Filed: Sep. 30, 1982

[51] Int. Cl.$^3$ ............................ B27K 3/00; B32B 7/00
[52] U.S. Cl. .................................... 428/270; 252/608; 428/272; 428/274; 428/276; 428/288; 428/289; 428/290; 428/921
[58] Field of Search ............... 428/921, 276, 272, 274, 428/288, 290, 289, 270; 252/3, 4, 7, 601, 606, 608

[56] References Cited

U.S. PATENT DOCUMENTS

| | | | |
|---|---|---|---|
| 2,526,462 | 10/1950 | Edelstein | 428/276 |
| 4,076,540 | 2/1978 | Stossel | 428/921 |
| 4,184,311 | 1/1980 | Rood | 428/921 |

*Primary Examiner*—Marion McCamish
*Attorney, Agent, or Firm*—Emory L. Groff, Jr.

[57] ABSTRACT

The composition for in situ treatment of textiles or textile products comprises in admixtures:
(a) an ammonium salt or mixture of ammonium salts having flame retardant properties,
(b) a water-soluble amide decomposing at a temperature of 100° C. to 200° C. to give ammonia, and
(c) aqueous acid in a concentration insufficient to cause degradation of a fabric by the composition when applied thereto.

11 Claims, No Drawings

FLAME RETARDANT COMPOSITIONS FOR TEXTILES AND TREATED TEXTILES

FIELD OF THE INVENTION

This invention relates to flame retardant compositions for treatment of textiles and textile products in situ, examples of such products being clothing, furnishings and industrial fabrics. For instance, woven and knitted constructions of cotton, viscose, rayon, synthetics such as polyester, natural/synthetic blends and wool may all be successfully treated by the compositions of this invention.

BRIEF DESCRIPTION OF THE PRIOR ART

Flame retardant treatment of textiles using soluble salts, especially ammonium compounds, is well known. The commercial mixtures employed are usually for use on either natural fibres or sythetic fibres, the composition of the mixture varying according to the nature of the fibre. This entails knowledge or judgement of the type of fibre for treatment and selection of an appropriate flame retardant product.

OBJECT OF THE INVENTION

It is an object of this invention to provide an optimum formulation which may meet the requirements for treatment of various fabrics and mixtures already made-up into products where treatment conditions differ from those of bulk processing before make-up of the articles.

SUMMARY OF THE INVENTION

According to this invention there is provided a flame retardant composition for in situ treatment of textiles or textile products comprising in admixture:
(a) an ammonium salt or mixture of ammonium salts having flame retardant properties,
(b) a water-soluble amide decomposing at a temperature of 100° C. to 200° C. to give ammonia, and
(c) aqueous acid in a concentration insufficient to cause degradation of a fabric by the composition when applied thereto, the pH of the composition preferably being 3 to 4.5.

The component (b) acts as an anti-scorch agent. When cellulose products, e.g. cotton, are dried at temperatures greater than 130° C. (especially in the pressure of suitable ammonium salts) scorching can occur. This arises from the action of strong acids liberated from ammonium salts at elevated temperatures. The pressure of component (b) which acts as a sink for ammonia at such temperatures retards the extent of formation of the strong acids.

The invention provides a composition based upon the said ammonium salt(s), the said water-soluble amide, the said aqueous acid, which composition can be used for natural, regenerated and synthetic fibres and their blends without need to identify fibre type. This is particularly important when offering products for in situ or consumer treatment, when the user may not have the knowledge or expertise to define the nature of the fibre.

With this invention adjustment of the pH of the composition can be made to suit requirements. In commercial processing penetration and adherence to synthetic fibres are achieved by pressure impregnation or drying at above ambient temperatures, both of which operations help to locate the retardant salts especially on synthetic fibres. These facilities are not available for in situ treatments where drying at ambient temperatures would normally lead to selective drying and absorption of the salts on natural components of a natural/synthetic blend or the patchy drying on synthetic fibres, especially when hanging in the form of curtains. It has been found that below a certain pH (but above the pH at which fabric degradation can occur) absorption of the inhibiting salts upon synthetic fibres is facilitated.

Preferably component (b) comprises area, acetamide or propionamide. Conveniently component (a) comprises at least one ammonium salt chosen from monammonium phosphate, diammonium phosphate, ammonium sulphate, ammonium bromide, ammonium chloride, ammonium iodide and ammonium sulphamate.

Suitably component (a) may represent 9.5 to 15.5 percent by weight of the composition, component (b) may represent 2.0 to 3.0 percent by weight of the composition and the concentration of the acid in the composition may be 1.5 to 2.0 percent by weight.

Usually the acid is a mineral acid, for instance sulphuric acid or hydrochloric acid or alternatively it may be an organic acid having a pH of less than 7, e.g. acetic acid.

DETAILED DESCRIPTION OF THE INVENTION

Preferred specific ingredients and preferred ranges of concentrations are set out as follows:

| | | |
|---|---|---|
| (A) | Monoammonium phosphate | 15-30 Kg/1000 Kg Solution |
| | Diammonium phosphate | 15-30 Kg/1000 Kg Solution |
| | Ammonium sulphate | 15-25 Kg/1000 Kg Solution |
| | Ammonium Bromide | 50-70 Kg/1000 Kg Solution |
| (B) | Urea, acetamide or propionamide | 20-30 Kg/1000 Kg Solution |
| (C) | Acid | 15-20 Kg/1000 Kg Solution |

Advantageously the range of components is:

| | | |
|---|---|---|
| (A) | Monoammonium phosphate | 20-25 Kg/1000 Kg Solution |
| | Diammonium phosphate | 20-25 Kg/1000 Kg Solution |
| | Ammonium sulphate | 18-22 Kg/1000 Kg Solution |
| | Ammonium Bromide | 55-65 Kg/1000 Kg Solution |
| (B) | Urea, acetamide or propionamide | 23-27 Kg/1000 Kg Solution |
| (C) | Acid | 18-22 Kg/1000 Kg Solution |

The invention is illustrated by way of the following examples of preferred compositions illustrative of the invention:

EXAMPLE 1

A sample of 402/sq.yd. 50/50 cotton polyester was sprayed with a composition illustrative of the invention to give 80-100% wet pick up of the solution. After air drying the sample passed the flammability standards before washing of:
BS 3120 when tested by method of BS 3119
NFPA 701 (small scale)
The composition used in this Example was:

| | | |
|---|---|---|
| (A) | Monoammonium phosphate | 25 Kg/1000 Kg |
| | Diammonium phosphate | 25 Kg/1000 Kg |
| | Ammonium sulphate | 18 Kg/1000 Kg |
| | Ammonium bromide | 55 Kg/1000 Kg |
| (B) | Urea | 23 Kg/1000 Kg |
| (C) | Sulphuric acid | 18 Kg/1000 Kg |
| | Balance, water | |

EXAMPLE 2

A sample of 802/sq.yd. pile faced fabric (cotton base, synthetic pile) was sprayed with a composition to give 80–100% wet pick up of the solution. After air drying the sample passed the flammability standards before washing of:

BS 3120 when tested by method of BS 3119
NFPA 701 (small scale)

The composition used in this Example was:

| (A) | Monoammonium phosphate | 25 Kg/1000 Kg |
| --- | --- | --- |
|     | Diammonium phosphate | 25 Kg/1000 Kg |
|     | Ammonium sulphate | 18 Kg/1000 Kg |
|     | Ammonium bromide | 55 Kg/1000 Kg |
| (B) | Urea | 27 Kg/1000 Kg |
| (C) | Hydrochloric acid | 18 Kg/1000 Kg |
|     | Balance, water | |

EXAMPLE 3

A sample of 2 to 3 ox/sq.yd nylon (as per parachute fabric) was sprayed with a composition to give 80 to 100% wet pick up of the solution. After air drying the sample passed the flammability standards before washing of:

BS 3120 when tested by method of BS 3119
NFPA 701 (small scale).

The composition used in this Example was:

| (A) | Monoammonium phosphate | 20 Kg/1000 Kg |
| --- | --- | --- |
|     | Diammonium phosphate | 20 Kg/1000 Kg |
|     | Ammonium sulphate | 18 Kg/1000 Kg |
|     | Ammonium bromide | 65 Kg/1000 Kg |
| (B) | Urea | 23 Kg/1000 Kg |
| (C) | Acetic acid | 22 Kg/1000 Kg |
|     | Balance, water | |

The preferred pH value is 3 to 4.5. Without the addition of acid the Ph would be about 6 to 7.

What is claimed is:

1. A flame retardant composition for in situ treatment of textiles and textile products comprising in admixture: 9.5 to 15.5 percent by weight of a component consisting of at least one ammonium salt having flame retardant properties, 2.0 to 3.0 percent by weight of a water-soluble amide which will decompose to give ammonia when heated to a temperature of 100° C. to 200° C., and aqueous acid in a concentration of 1.5 to 2.0 percent (by weight) of the composition and with the pH of the composition being 3 to 4.5 thereby ensuring that the composition is sufficiently diluted for application to a fabric without degrading it.

2. A composition according to claim 1, wherein said water-soluble amide comprises urea.

3. A composition according to claim 1, wherein said water-soluble amide comprises acetamide.

4. A composition according to claim 1, wherein said water-soluble amide comprisies propionamide.

5. A composition according to claim 1, wherein said at least one ammonium salt having flame retardant properties comprises at least one ammonium salt selected from the group consisting of monoammonium phosphate, diammonium phosphate, ammonium sulphate, ammonium bromide, ammonium chloride, ammonium iodide and ammonium sulphamate.

6. A composition according to claim 1, wherein the acid is a mineral acid.

7. A composition according to claim 1, wherein the acid is selected from sulphuric acid and hydrochloric acid.

8. A composition according to claim 1, wherein the acid is an organic acid whose pH is less than 7.

9. A composition according to claim 1, wherein the acid is acetic acid.

10. A textile or textile product which has been treated by the flame retardant composition claimed in claim 1.

11. A textile or textile product which has been treated by the flame retardant composition claimed in claim 1, said textile of textile product being selected from the group consisting of cotton, viscose, rayon, synthetics, natural/synthetic blends and wool.

* * * * *